March 31, 1970 C. R. CUZA Re. 26,844

CONTINUOUSLY OPERATING CENTRIFUGAL DEVICE

Original Filed Aug. 14, 1967 2 Sheets-Sheet 1

INVENTOR.
CERSO ROBERTO CUZA

BY John Cyril Malloy

ATTORNEY.

CONTINUOUSLY OPERATING CENTRIFUGAL DEVICE

Original Filed Aug. 14, 1967 2 Sheets-Sheet 2

INVENTOR.
CERSO ROBERTO CUZA

BY John Cyril Malloy

ATTORNEY.

United States Patent Office

Re. 26,844
Reissued Mar. 31, 1970

26,844
CONTINUOUSLY OPERATING CENTRIFUGAL DEVICE

Cerso Roberto Cuza, 2940–E NW. 22nd St., Miami, Fla. 33142

Original No. 3,385,443, dated May 28, 1968, Ser. No. 660,434, Aug. 14, 1967. Application for reissue Jan. 22, 1969, Ser. No. 796,641
Int. Cl. B01d *35/18*
U.S. Cl. 210—178 22 Claims

Matter enclosed in heavy brackets [ ] appears in the original patent but forms no part of this reissue specification; matter printed in italics indicates the additions made by reissue.

ABSTRACT OF THE DISCLOSURE

A centrifuge which is adapted to separate granular solid matter from liquids or fluids and particularly a device of this type for separating molasses or syrup from massecuite or concentrated granular sugar solutions in a continuous operation. The massecuite or other material is fed through a vertical centrally disposed drive tube, said tube also being utilized to drive the two inner members of a frusto-conical basket assembly which are spaced apart to provide a chamber for the reception of the massecuite from the drive tube. A third or outer member of the frusto-conical basket assembly is driven at a somewhat slower speed and is provided with a plurality of air jets to sweep the outer surface of the intermediate or perforated member of the basket assembly with pressurized air for purging the granular solids after filtration and directing said solids upwardly to a discharge mechanism.

This invention relates to centrifugal filtering or separating devices and more particularly to a new and improved form of such a device in which the filtering or separating operation is performed in a continuous manner and which is particularly suited for separating solid matter such as sugar granules from molasses or syrup and discharging each to separate collection receptacles.

At persent most successful centrifugals in use for separating molasses from massecuite or sugar solutions have remained unchanged in general design for decades and operate on the separate batch principle. It can be readily seen that considerable time is consumed due to the necessity for periodically charging and discharging the receptacle in this type of device.

One of the principal objects of the instant invention is to provide a continuously operating centrifugal filtering device which includes a rotatable filter basket assembly composed of three frustro-conical members including an inner member having its wall and bottom disposed in a spaced relation to an intermediate perforated filter basket and an outer spider member in virtual nested relation with said perforated filter basket. A vertical driven feed tube which is coaxial with the axis of rotation of the filter basket assembly projects downwardly into a fixed relation to the inner frustro-conical member and the intermediate perforated filter basket and provides discharge openings adjacent its lower distal end to continuously charge the filter basket with massecuite and to provide centrifugal operation thereof.

A further object of the invention is to provide a screen of fine mesh fixed to and in overlying relation to the inner surface of the perforated filter basket to permit the molasses or syrup to pass therethrough while preventing such passage of the solids or sugar granules.

A still further object of the invention is to provide arms of the outer frustro-conical spider member with suitable bores for the passage of air under pressure to be discharged through a plurality of jets directed upwardly and inwardly against the outer surface of the perforated filter basket for purging the granular solids after filtration and directing them upwardly to a discharge means.

Another object of the instant invention is to drive the outer frustro-conical spider member at a rate of speed somewhat slower than the speed of the perforated filter basket to permit the air pressure from the jets to sweep the entire outer surface of said filter basket.

Yet another object of the instant invention is to provide a series of spaced parallel annular shelves about the outer surface of the inner frustro-conical member to cooperate with the air pressure forces in directing the solid granules in an upward direction.

Another object of this invention is to provide an annular housing circumposed about the frustro-conical basket assembly for collecting and discharging the filtrate after passage through the perforated filter basket and between the arms of the outer frustro-conical spider.

Another object of the instant invention is to provide an annular collection shelf for the solid granules adjacent the top of said housing and said perforated filter basket and a driven spider member providing downwardly projecting fins to sweep the solid granules into a discharge opening or chute.

In accordance with these and numerous other objects and advantages which will become more fully apparent hereinafter, the instant invention will now be described with reference to the accompanying drawings, in which.

Figure 1:
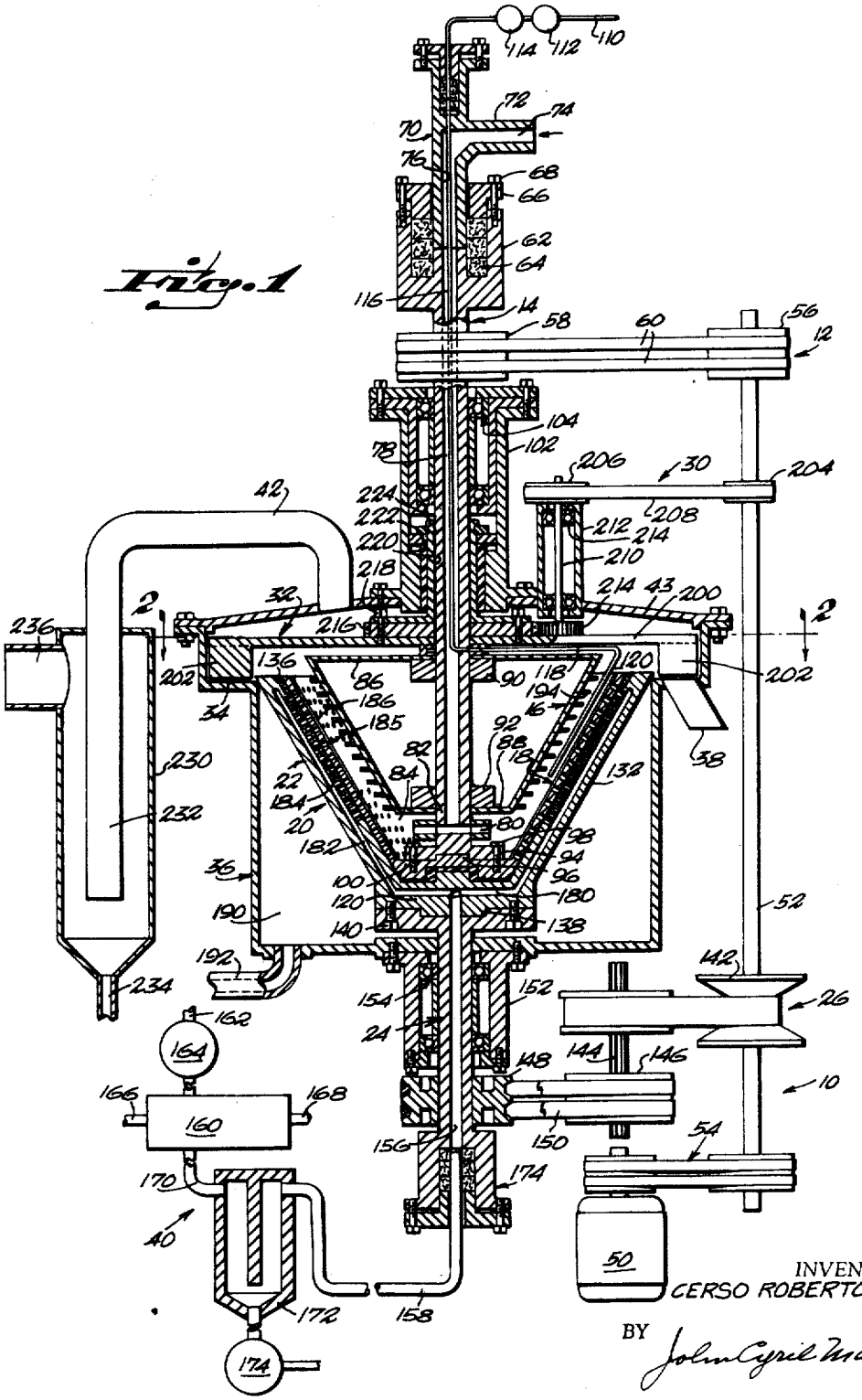
FIGURE 1 is a vertical sectional view through the device of the instant invention.
Figure 2:
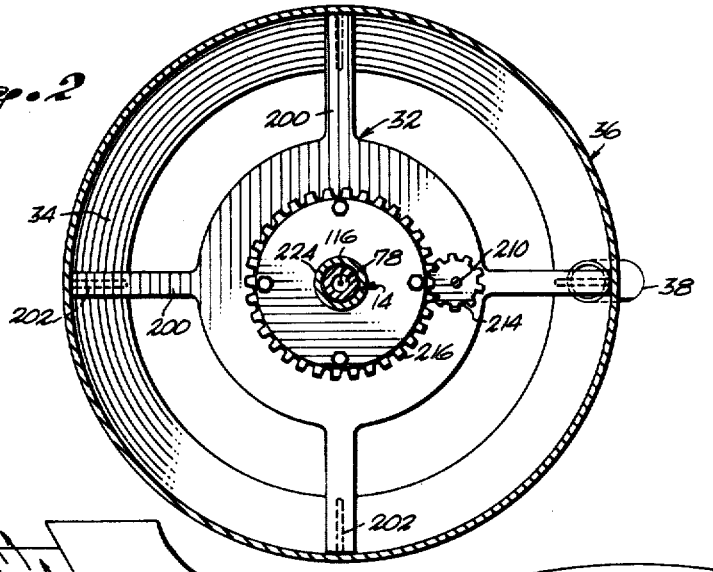
FIGURE 2 is a horizontal sectional view taken along the line 2—2 and looking in the direction of the arrows.

Referring now to the drawings in which like reference characters designate like or similar parts throughout the various figures, the numeral 10 indicates a drive assembly generally which includes a first drive 12 to an upwardly extending vertical drive tube 14 in coaxial driving connection on the axis of rotation to the inner and intermediate members 16 and 18 of a frustro-conical basket assembly 20. An outer member or spider cone 22 of the basket assembly is fixed to a second vertical drive tube 24 extending downwardly in axial alignment with the drive tube 14 and includes a second drive means, indicated generally at 26, from the drive assembly 10. A third drive means 30 operates a spider 32 which sweeps the solids, such as sugar crystals, from an annular shelf 34 adjacent the top edge of an annular housing 36 into a discharge outlet 38 in a manner to be subsequently described.

Pressurized air is provided to the basket assembly 20 through a standard type of mechanism 40 which controls the temperature and moisture content thereof and a vent pipe 42 is provided in the roof 43 of the housing 36 to discharge the air and to permit a free circulation of air under pressure through the basket assembly in a manner to be described later in more detail.

The drive assembly 10 includes a motor 50 in driving connection with a main drive shaft 52 through a pulley and belt assembly 54. As viewed in FIGURE 1, at the upper distal end of the drive shaft, the first drive 12 includes pulleys 56 fixed to the shaft in driving connection with pulleys 58, fixed to the upwardly extending vertical drive tube 14, by means of belts 60. At its upper distal end, the tube 14 includes an enlarged portion 62 containing suitable packing glands 64, a retainer cap 66 and adjustment screws 68 to maintain a seal between the drive tube and a stationary tubular member 70 having a laterally extending tubular arm 72 providing a charging port 74 for the massecuite which is fed from a suitable hopper or the like, not shown, and proceeds downwardly through the passage 76 of stationary tube 70 into the aligned passage 78 of the drive tube 14. Laterally extending ports 80 adjacent the lower distal end 82 of the drive tube 14 discharge the massecuite into a chamber 84 formed between the spaced outer wall of the inner cone 16 and the inner wall of the intermediate or filter cone 18. The lower distal end of the drive tube 14 passes axially through the top and bottom walls 86 and 88 of the inner cone 16 and cooperating collars 90 and 92 and is held in fixed relation thereto as by welding. Immediately adjacent and below the discharge ports 80, the drive tube terminates in an annular foot 94, keyed and bolted as at 96 and 98 respectively to the floor 100 of the intermediate filter cone 18. Thus it can be seen that the massecuite is fed through the passage provided in the drive tube into the filter chamber 84 and the drive tube which is driven at a relatively high rate of r.p.m. is fixed to the inner and intermediate filter cones for centrifugal operation thereof.

A bearing housing 102 is provided centrally of the housing roof 43 and includes an appropriate ball bearing assembly 104 to rotatably journal the drive tube 14.

As it is desirable to add a small amount of water to the massecuite, a water supply tube 110 including volume and pressure gauges 112 and 114 is provided which extends into the stationary tubular member 70 and communicates with a revolving water supply tube 116 which projects downwardly through the drive tube 14 and then laterally outwardly as at 118 immediately adjacent the top wall 86 of the inner cone 16, and thence downwardly and inwardly at 120 into the chamber 84. A suitable conventional water seal is provided adjacent the top of tube 70 in the form of a packing gland, which seals the point of communication between the stationary infeed tube and the revolving tube 116.

Figure 3:
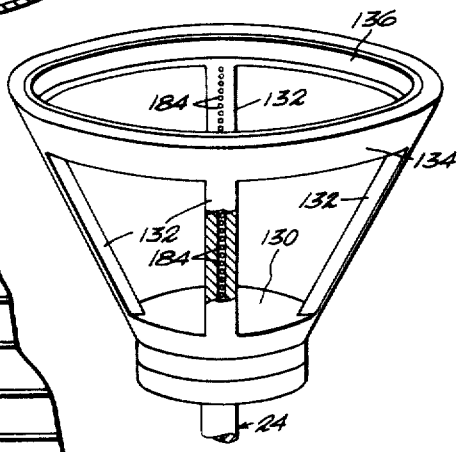
FIGURE 3 is a perspective view of the outer frustro-conical spider member.

The outer or spider cone 22 includes a floor 130, FIGURE 3, and a plurality, four illustrated, of diverging arms 132 joined by a ring portion 134 at the top and preferably includes a bearing ring 136 of nylon or the like at the upper inner edge thereof where it contacts the filter cone 18. The second vertical downwardly extending drive tube 24 is keyed and bolted as at 138 and 140 in driving relation to the floor 130 of the spider cone 22 and is provided with a variable speed drive from the shaft 52, as by the Reeves drive illustrated diagrammatically at 142, to a stub shaft 144 which is in turn in driving engagement with the drive tube 24 by the pulleys 146, 148 and belts 150. A suitable bearing housing 152 fixed to and centrally of the housing 36 includes a ball bearing assembly 154 to journal the drive tube 24.

Figure 4:
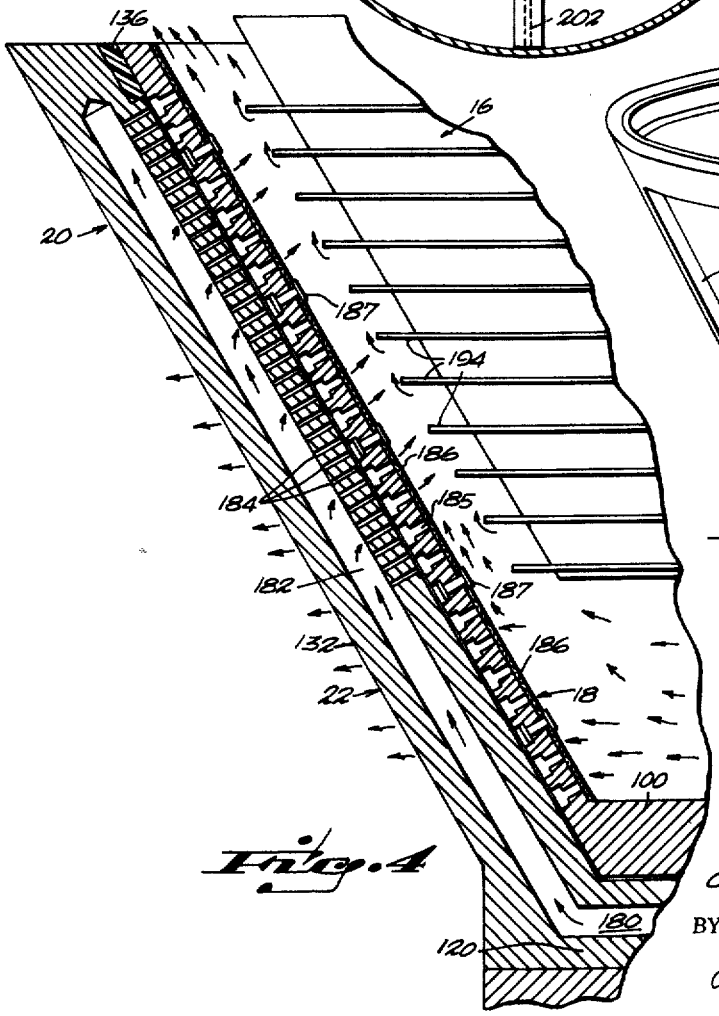
FIGURE 4 is an enlarged fragmentary sectional view of a portion of the three frustro-conical members as seen in FIGURE 1.

Suitably conditioned air under pressure is supplied to the central passage 156 of the drive tube 24 from a conduit 158. This conduit extends from the mechanism 40 which preferably includes a heat exchanger 160 and an air inlet 162 and pressure gauge 164. Water is passed through the heat exchanger by means of inlet and outlet tubes 166 and 168, the water temperature varying according to the temperature of the air entering through tube 162. The temperature conditioned air passes through an outlet tube 170 into a receptacle 172 where condensed moisture is exhausted through a one way valve 174 and the air passes into the tube 158 and thence through a packing gland assembly 174, similar to the assembly 64 as previously described, into the drive tube passage 156 and upwardly to radially extending passages 180 in the floor of the spider cone 22. One radially extending passage 180 is provided in communication with an air passage 182 diverging upwardly through each of the arms 132 of the spider cone 22, and a plurality of air jets 184 is provided extending inwardly therefrom in the order of 90° to direct streams of air inwardly and upwardly through the filter cone 18, the side walls of which are perforated as best illustrated at 185 in FIGURE 4. In addition to the perforation 185, a fine screen 186 is provided in overlying relation to the inside diverging wall of the filter cone and is preferably attached to the cone by rivets or the like 187 passing through selected perforations. In this manner the fine screen can be replaced when necessary.

In operation the massecuite is continuously charged into the chamber 84 as previously described and the centrifugal operation of the basket assembly 20 causes the filtrate or molasses to pass through the fine filter screen 186, the perforations 185 and between the arms 132 of the spider cone into a chamber 190 of the housing 36 to be discharged into a suitable receptacle through an outlet conduit 192.

The solids, sugar granules for instance, collect on the inside surface of the fine screen 186 of the filter cone and because of the centrifugal action and the diverging walls of the cone, tend to pass upwardly. The jet stream of air directed inwardly and upwardly through the perforations and fine screen, purge the sugar crystals from the screen and keep them in an upward movement. A series of spaced parallel annular shelves 194 fixed about the outer surface of the inner cone cooperate with the jet streams of air in keeping the crystals moving in an upward direction by arresting any tendancy for some crystals to fall downwardly. It has been found that the jet streams of air directed inwardly and upwardly overcome the normal tendancy of the crystals to move outwardly by centrifugal forces and in fact move them inwardly and upwardly against the annular shelves 194, and the centrifugal forces of the inner cone then tend to move the crystals back outwardly. In other words, the combination of jet streams of air directed inwardly and upwardly, the annular shelves on the inner cone, and the centrifugal forces of the inner cone all cooperate to cause a turbulance which directs the crystals upwardly from shelf to shelf until they reach the top of the basket assembly 20 beyond the jet streams of air where the centrifugal forces deposit the crystals on the annular shelf 34 adjacent the top edge of the housing 36.

The outer spider cone is provided with a variable speed drive and is driven at a somewhat slower speed than the common speed of the inner cone and the filter cone; the difference of angular velocity is in the order of about 50 to 60 r.p.m., so as to permit the jet streams of air to sweep the entire outer surface of the filter cone at a relatively slow speed in relation to that causing the centrifugal forces to separate the mass into its constituent liquid and crystal components.

The crystal discharge mechanism 32 in the form of a spider is provided with a plurality of outwardly extending arms 200 with downwardly extending plows 202 in sweeping engagement with the shelf 34 to move the sugar crystals into the discharge outlet 38. As previously stated, a third drive means 30 is employed to operate the spider 32 which includes pulleys 204 and 206 and a belt 208 in driving engagement from the main drive shaft 52 to a shaft 210. A bearing housing 212 fixed in the roof 43 includes suitable ball bearing 214 to journal shaft 210. Small gear 214 fixed to the lower distal end of the shaft is in driving engagement with a larger gear 216 bolted as at 218 centrally of the spider 32 to drive the spider at a somewhat reduced speed. The large gear 216 is centrally bored as at 220 to receive the drive tube 14 axially therethrough and a bearing sleeve or collar 222 is provided in the bearing housing 102 to rotatably journal the elongated hub portion 224 of the gear therein.

As previously stated a vent pipe 42 is provided in the roof 43 of the housing to discharge the air passing through the basket assembly. Pipe 42 communicates with a tank 230, passing vertically downwardly therethrough as at 232 to discharge condensation through a bottom port 234 while the air is vented through an outlet 236 adjacent the top thereof.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A continuously operating centrifugal machine for separating a mass into constituent elements of solids in crystalline form and liquids comprising:

(a) a first vertical drive tube;

(b) a first frusto-conical member keyed for rotation with said first tube and having a continuous outer surface including a series of axially spaced radially projecting shelfs fixed to its outer surface;

(c) a second frusto-conical member keyed for rotation with said first tube and axially spaced from and circumposed about said first member forming a chamber therebetween, the surface of said second member being perforated and including screen means of complementary form fixed in overlying relation to the inner face of the perforated surface;

(d) a second drive tube below and in coaxial relation with said first tube;

(e) a frusto-conical openwork outer member of spider form including a plurality of upwardly and outwardly inclined extending arms circumposed about said second member, each of said arms having an air passageway along their respective lengths, and a multiplicity of air jets spaced along the lengths of said arms and in the inner faces thereof and in communication with said air passageways to direct fluid flow toward the outer face of the perforated wall of said second member;

(f) a first drive means to rotate said first and second members at a common speed to discharge filtrate of a mass flowed into said chamber;

(g) second drive means for rotating said outer spider member at an angular velocity relative to that of the common angular velocity of said first and second members such that the relative movement between said first and second members and that of the outer member is such that air flowed through the jets will purge the solids on the intermediate member by directing a stream of air thereover; and (h) means adjacent the top of said chamber to accumulate and discharge said solids.

2. A continuously operating centrifugal machine as in claim 1 including a water supply means for providing controlled amounts of water to said chamber between said first and second members.

3. A continuously operating centrifugal machine as in claim 2 in which said water supply means comprises a tube extending from a source exterior of the machine axially downwardly through said first drive tube to said chamber.

4. A continuously operating centrifugal machine as in claim 1 including a stationary member providing a charging port for a solution containing solids, said stationary member being in communication with access means through said first vertical drive tube.

5. A continuously operating centrifugal machine as in claim 4 including a seal means between said stationary member and said first vertical drive tube.

6. A continuously operating centrifugal machine as in claim 1 including means to condition the air as to temperature and moisture content.

7. A continuously operating centrifugal machine as in claim 6 in which said means for conditioning said air includes a heat exchanger and dehumidifier.

8. A continuously operating centrifugal machine as in claim 7 including a stationary air conduit from said heat exchanger and dehumidifier and a seal means connecting said conduit to air access means through said second vertical downwardly extending drive tube.

9. A continuously operating centrifugal machine as in claim 1 including a housing circumpositioned about the assembly providing a chamber interiorly thereof to collect said filtrate from the assembly.

10. A continuously operating centrifugal machine as in claim 9 including a discharge port for said filtrate from said-housing chamber.

11. A continuously operating centrifugal machine as in claim 9 including a removable roof portion for said housing.

12. A continuously operating centrifugal machine as in claim 11 including an exhaust conduit in said roof portion for said air.

13. A continuously operating centrifugal machine as in claim 9 including a diametrically enlarged portion of said housing adjacent the top edge thereof, said enlarged portion providing a horizontal shelf adjacent the top edge of said assembly to collect said solids thereon.

14. A continuously operating centrifugal machine as in claim 13 including collector means and a discharge port for said solids extending downwardly from said shelf.

15. A continuously operating centrifugal machine as in claim 14 in which said collector means comprises a driven spider providing a plurality of radially extending arms including downwardly extending plow members in engagement with the vertical wall of said diametrically enlarged housing portion and said shelf to dislodge said solids therefrom and to move same to said discharge port.

16. A continuously operating centrifugal machine as in claim 1 including removable fastening means to hold said screen means in overlying relation to the inner surface of said perforated wall of said second member.

*17. A continuously operating centrifugal machine for separating a mass into constituent elements of solids in crystalline form and liquids comprising:*

*(a) a first vertical drive tube;*

*(b) a first frusto-conical member rotatably carried by said first tube and having a continuous outer surface including a series of axially spaced, radially projecting shelves on its outer surface;*

*(c) a second frusto-conical member mounted for rotation with said first tube and axially spaced from and circumposed about said first member forming a chamber therebetween, the surface of said second member being perforated and including screen means of complementary form fixed in overlaying relation to the inner face of the perforated surface;*

*(d) a second drive tube below and in coaxial relation with said first tube;*

*(e) a frusto-conical openwork outer member of spider form including a plurality of upwardly and outwardly inclined extending arms circumposed about said second member, each of said arms having an air passageway along their respective lengths, and a multiplicity of air jets spaced along the lengths of said arms and in the inner faces thereof and in communication with said air passageways to direct fluid flow toward the outer face of the perforated wall of said second member;*

*(f) drive means to rotate said first and second members at a common speed to discharge filtrate of a mass flowed into said chamber and at an angular velocity relative to that of the spider member such that air flowed through the jets will purge the solids on the intermediate member by directing a stream of air thereover; and*

*(g) means adjacent the top of said member to accumulate and discharge said solids.*

*18. A continuously operating centrifugal machine as set forth in claim 17 including a water supply means for providing controlled amounts of water to said chamber between said first and second members.*

*19. A continuously operating centrifugal machine as set forth in claim 17 including a stationary member providing a charging port for a solution containing solids, said stationary member being in communication with access means through said first vertical drive tube.*

*20. A continuously operating centrifugal machine as set forth in claim 17 including means to condition the air as to temperature and moisture content.*

*21. A continuously operating centrifugal machine as set forth in claim 17 including a housing circumpositioned about the assembly providing a chamber interiorly thereof to collect said filtrate from the assembly.*

*22. A continuously operating centrifugal machine as set forth in claim 17 including removable fastening means to hold said screen means in overlying relation to the inner surface of said perforated wall of said second member.*

References Cited

The following references, cited by the Examiner, are of record in the patented file of this patent or the original patent.

UNITED STATES PATENTS

| | | | |
|---|---|---|---|
| 618,814 | 1/1899 | Darby | 210—369 |
| 710,607 | 10/1902 | Peterson | 210—213 |
| 1,319,150 | 10/1919 | Gibson | 210—369 |
| 1,589,097 | 6/1926 | Behr | 210—369 X |
| 1,630,201 | 5/1927 | Metcalfe | 210—369 |
| 1,832,269 | 11/1931 | Webb | 210—369 |

FOREIGN PATENTS

| | | |
|---|---|---|
| 421,336 | 5/1947 | Italy. |

JAMES L. DECESARE, Primary Examiner

U.S. Cl. X.R.

210—213, 369, 377; 233—13